(12) United States Patent
Muyskens et al.

(10) Patent No.: US 7,375,721 B2
(45) Date of Patent: May 20, 2008

(54) KEYBOARD WITH CHANGEABLE KEY DISPLAY

(75) Inventors: Neil H. Muyskens, Lexington, KY (US); Samuel M. Katz, Givat Ze'ev (IL)

(73) Assignee: Karismatech, Ltd., Jerusalem (IL)

( * ) Notice: Subject to any disclaimer, the term of this patent is extended or adjusted under 35 U.S.C. 154(b) by 397 days.

(21) Appl. No.: 10/720,981

(22) Filed: Nov. 24, 2003

(65) Prior Publication Data

US 2005/0110762 A1    May 26, 2005

(51) Int. Cl.
*G09G 5/00*    (2006.01)

(52) U.S. Cl. .................. 345/172; 345/168; 345/170; 361/680

(58) Field of Classification Search ......... 345/168–172
See application file for complete search history.

(56) References Cited

U.S. PATENT DOCUMENTS

| | | | |
|---|---|---|---|
| 4,823,311 A | 4/1989 | Hunter et al. | |
| 4,853,697 A | 8/1989 | Pellizzari et al. | |
| 5,340,955 A * | 8/1994 | Calvillo et al. | 200/302.2 |
| 5,515,045 A | 5/1996 | Tak | |
| 5,650,799 A | 7/1997 | Melen | |
| 5,774,115 A | 6/1998 | Jaeger et al. | |
| 5,786,811 A | 7/1998 | Jaeger | |
| 5,818,361 A | 10/1998 | Acevedo | |
| 5,831,598 A | 11/1998 | Kauffert et al. | |
| 5,867,149 A | 2/1999 | Jaeger | |
| 5,900,599 A | 5/1999 | Ohashi et al. | |
| 5,914,676 A * | 6/1999 | Akpa | 341/23 |
| 6,498,614 B1 * | 12/2002 | Amari et al. | 345/168 |
| 6,625,649 B1 | 9/2003 | D'Souza et al. | |
| 2002/0084919 A1 | 7/2002 | Green | |
| 2002/0149568 A1 | 10/2002 | Kim | |

* cited by examiner

*Primary Examiner*—Duc Q Dinh
(74) *Attorney, Agent, or Firm*—Knobbe, Martens, Olson & Bear LLP

(57) ABSTRACT

A keyboard system comprises a first plurality of keys. The first plurality of keys have top surfaces with fixed indicia disposed thereon. The keyboard system further comprises a recessed section. The keyboard system further comprises a programmable display key module disposed in the recessed section. The programmable display key module comprises a dynamically programmable flat panel display having a plurality of display areas. The programmable display key module further comprises a second plurality of keys. Each of the second plurality of keys has at least a first transparent surface and a switch engagement structure. At least a portion of each key overlays a corresponding display area of the dynamically programmable flat panel display. The programmable display key module further comprises a plurality of switches. Each switch is positioned adjacent to a corresponding switch engagement structure of a corresponding key. At least a first of the switches is activated by the corresponding switch engagement structure when the corresponding key is depressed.

19 Claims, 8 Drawing Sheets

KEYBOARD WITH CHANGEABLE KEY DISPLAY

FIELD OF THE INVENTION

The present invention relates generally to keyboards, and relates specifically to keyboards with changeable key labels.

BACKGROUND OF THE INVENTION

Conventional personal computer keyboards generally have keys with fixed labeling. The key labeling can be textual, graphical, or a combination of both text and graphics. For example, many keyboards have auxiliary function keys with fixed key labels, such as "Web", "Mail" or "Search". While a wide variety of different functions can often be assigned to such keys, thereby providing users with useful shortcuts to frequently used functions, the presence of the fixed key labels can cause confusion if the assigned functionality of a key does not correspond to the key label. This confusion is further compounded by the fact that the auxiliary function keys can be programmed to have different functionality in different contexts. For example, a key with a "←" icon may cause a web browser application to move "back" to a previously-viewed web page, but may cause a word processor to "undo" the user's most recent action.

To address the confusion that arises when a user cannot remember which functions are assigned to which keys in which contexts, printed reference cards or help files stored on the personal computer and displayed on a computer monitor are sometimes used. However, these options are generally inconvenient for users, and thus several keyboards have been developed wherein a changeable message can be displayed on individual keys. The message can be textual or graphical, and can vary depending on the context in which the keys are used. For example, some attempted solutions to the foregoing problems provide individual programmable displays for each key, wherein the displayed information is changeable depending on context. However, many of these types of keyboards are expensive and difficult to fabricate, and so have not gained wide acceptance.

SUMMARY OF THE INVENTION

In accordance with the foregoing, exemplary embodiments of the keyboard systems disclosed herein provide a key structure for use with a changeable key display. In particular, at least some embodiments advantageously provide a key structure having a comfortable tactile response for users. Further, some embodiments provide for an easily assembled keyboard, wherein a single display, such as a liquid crystal display ("LCD"), is used to display changeable messages under a plurality of keys on the keyboard. The changeable message can be made to correspond to the function assigned to the overlying key in a particular context.

In one embodiment, a keypad assembly includes a display having a display surface and a display perimeter surrounding the display surface. The keypad assembly further comprises a sidewall positioned along at least a portion of the display perimeter. The sidewall extends above the display surface to a sidewall pivot line. The keypad assembly further comprises a key actuator having a short arm and a long arm. The key actuator contacts the sidewall pivot line, thereby allowing the key actuator to rotate about the sidewall pivot line. The keypad assembly further comprises a switch positioned adjacent the key actuator short arm. When a force is applied to move the key actuator long arm toward the display, the key actuator rotates about the sidewall pivot line and the key actuator short arm engages the switch.

In another embodiment, an apparatus comprises a display having a display surface and a display perimeter surrounding the display surface. The display comprises a plurality of display regions. The apparatus further comprises a sidewall positioned along at least a portion of the display perimeter. The sidewall extends above the display surface to a sidewall pivot line. The apparatus further comprises a plurality of key actuators, wherein each of the key actuators are associated with and positioned adjacent to one of the plurality of display regions. The apparatus further comprises a plurality of switches. Each of the switches is associated with one of the plurality of key actuators, such that moving the key actuator closer to the display causes the switch to be activated.

In another embodiment, a method for labeling keys on a keypad assembly comprises positioning a plurality of key actuators over a display. Each of the key actuators has a first arm and a second arm, such that pressing the first arm closer to the display causes the second arm to activate one of a plurality of switches. The method further comprises electrically connecting the display to a processor configured to provide display data to the display.

In another embodiment, a computer keyboard comprises a programmable display having a plurality of display regions. The computer keyboard further comprises a plurality of computer keyboard keys. Each key overlays, at least in part, a corresponding display region of the programmable display. Each key has at least a clear top surface so that the corresponding display region is visible.

In another embodiment, a computer keyboard comprises a dynamically programmable display having a plurality of display areas. The computer keyboard further comprises a plurality of computer keyboard keys. Each key has at least a first clear surface and a switch actuator. Each key is positioned over a corresponding display area of the dynamically programmable display. The computer keyboard further comprises a plurality of switches. Each switch is positioned adjacent to a corresponding switch actuator of a corresponding key. At least a first of the switches is activated by the corresponding switch actuator when the switch actuator key is depressed.

In another embodiment, a method comprises providing a keyboard base frame. The method further comprises mounting a keybutton frame assembly in the keyboard base frame. The keybutton frame assembly configured to support a plurality of keys. The method further comprises mounting a keyboard top frame having a display bay to the keyboard base frame. The keybutton frame assembly is positioned between the two keyboard frames. The plurality of keys are exposed through an open portion of the keyboard top frame. The method further comprises positioning a display subassembly in the display bay.

In another embodiment, a method comprises providing a display subassembly base frame. The method further comprises positioning a flexible membrane assembly having a plurality of dome switches in the display subassembly base frame. The method further comprises positioning a display over the flexible membrane assembly. The method further comprises positioning a plurality of key actuators over the display. The key actuators have a switch actuator adjacent the dome switches.

In another embodiment, a keyboard system comprises a first plurality of keys. The first plurality of keys have top surfaces with fixed indicia disposed thereon. The keyboard system further comprises a recessed section. The keyboard system further comprises a programmable display key module disposed in the recessed section. The programmable display key module comprises a dynamically programmable flat panel display having a plurality of display areas. The programmable display key module further comprises a second plurality of keys. Each of the second plurality of keys has at least a first transparent surface and a switch engagement structure. At least a portion of each key overlays a corresponding display area of the dynamically programmable flat panel display. The programmable display key module further comprises a plurality of switches. Each switch is positioned adjacent to a corresponding switch engagement structure of a corresponding key. At least a first of the switches is activated by the corresponding switch engagement structure when the corresponding key is depressed.

BRIEF DESCRIPTION OF THE DRAWINGS

Exemplary embodiments of a keyboard having changeable key displays are illustrated in the accompanying drawings, which are for illustrative purposes only. The drawings comprise the following figures, in which like numerals indicate like parts.

DETAILED DESCRIPTION OF PREFERRED EMBODIMENTS

The present invention relates generally to keyboards, and relates specifically to keyboards with changeable key displays. Such keyboards advantageously help users to remember the functions that are assigned to multi-function keys and further allow applications to dynamically change the display as needed. The following is a detailed description of exemplary keyboard systems that have changeable key displays. As discussed below, the keyboards systems are advantageously relatively easy to manufacture and are cost efficient to implement. Optionally, a single display assembly can be used to provide several keys with changeable indicia.

Keyboard Structure.

Figure 1:
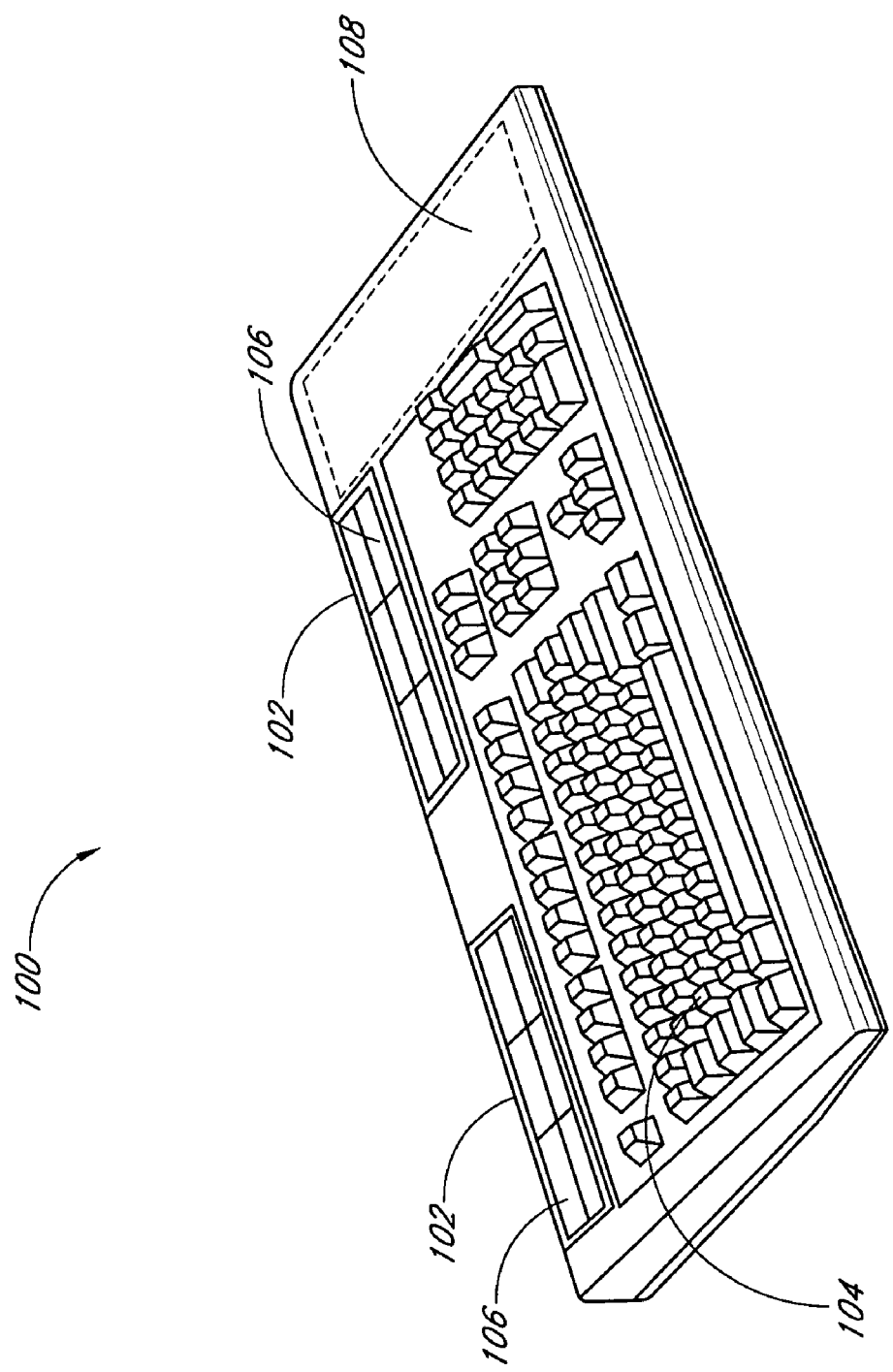
FIG. 1 is an exemplary embodiment of a keyboard having keys with changeable key displays.

FIG. 1 illustrates an exemplary embodiment of a keyboard 100 having a plurality of conventional keys 104 having fixed or printed on key labels, as well as a plurality of keypad assemblies 102 with changeable, programmable key displays. The keyboard 100 can be configured for use with, for example, a computer, a typewriter, a cash register, or another component configured to receive input from a user pressing buttons. The keyboard 100 can be connected to such components via, for example, a cable or a wireless interface, such as a bluetooth or 802.11 interface.

In the exemplary embodiment illustrated in FIG. 1, the keyboard 100 includes two keypad assemblies 102, each comprising six clear keys 106 overlaying a display (not visible). The structure of exemplary embodiments of the keypad assemblies 102 will be provided in greater detail below. In modified embodiments, a different number of keypad assemblies 102 can be incorporated into the keyboard 100. Additionally, each of the keypad assemblies 102 can include more than six or fewer than six clear keys 106. Furthermore, although FIG. 1 illustrates the keypad assemblies 102 positioned above the conventional keys 104, in other embodiments the keypad assemblies 102 can be positioned below, or on either side, of the conventional keys 104, such as in area 108 illustrated in FIG. 1.

In still other embodiments, the keypad assemblies 102 can be positioned on the opposite side of the keyboard 100 from the conventional keys 104. In such a "dual-sided" keyboard, the user can flip the keyboard over depending on whether the conventional keys 104 or the clear keys 106 are to be used. Raised support legs on both sides of the keyboard 100 prevent the unused keys from being pressed inadvertently. Such a design is particularly advantageous in applications where desk space is limited. For example, a teller can use the conventional keys 104 to logon to a terminal, and then flip the keyboard over to access the clear keys 106 that provide the functionality for most of the teller's operations. The keyboard can be flipped again if the conventional keys 104 are to be used for system administration of the terminal.

Figure 2:
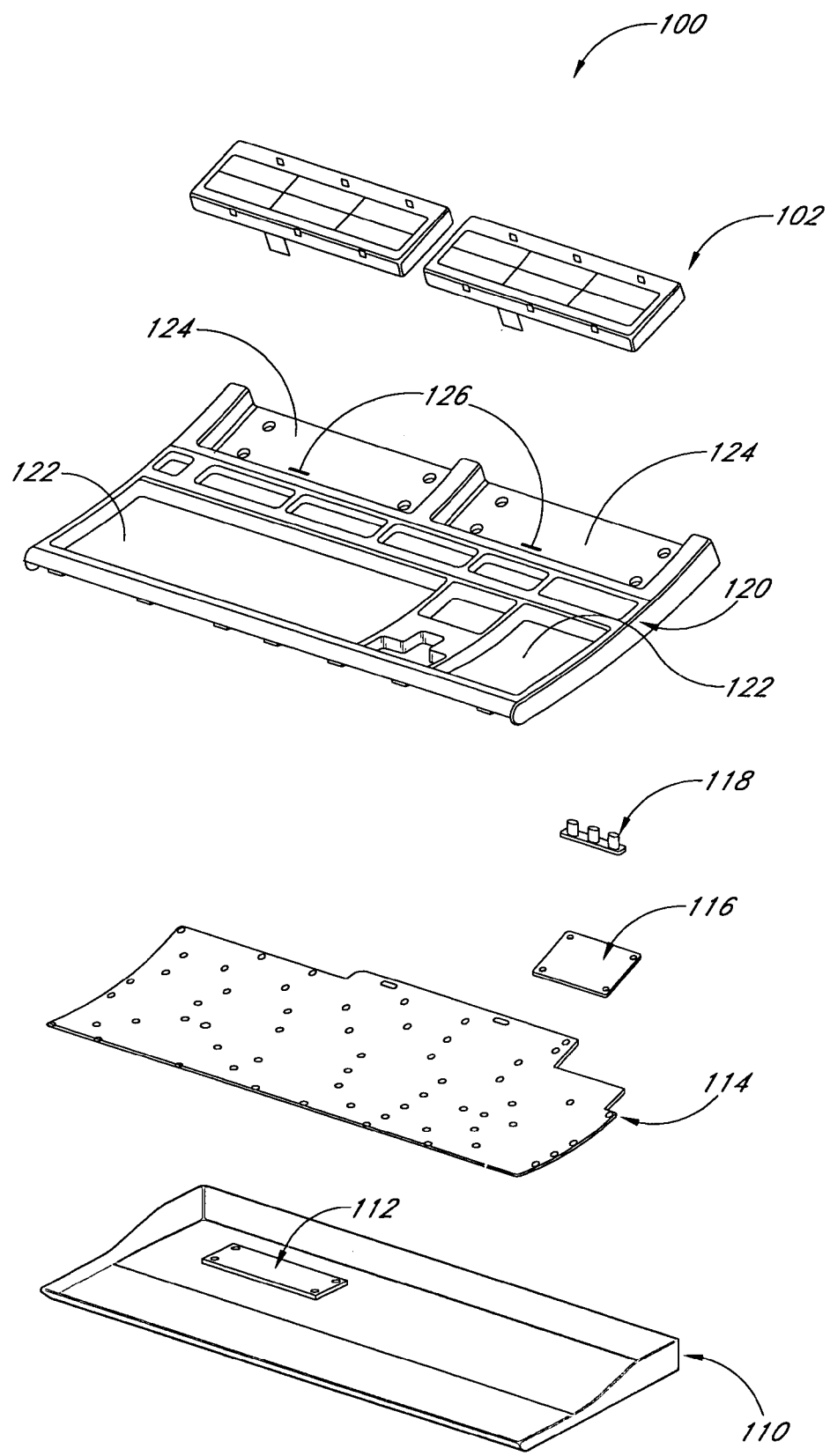
FIG. 2 is an exploded view of certain components of another exemplary embodiment of a keyboard having keys with changeable key displays.

FIG. 2 is an exploded view of certain components of one embodiment of the keyboard 100 illustrated in FIG. 1. As illustrated, in such embodiments the keyboard 100 includes a base frame 110 configured to support a display and keypad controller 112 and a keybutton frame assembly 114. In an exemplary embodiment, the base frame 110 includes molded plastic, although other rigid materials capable of supporting the keyboard components described herein can be used in other embodiments. The keypad controller 112 and the keybutton frame assembly 114 are secured in the base frame 110 using an acceptable fastening mechanism, such as screws, epoxy, and/or snap-fittings. Other fastening mechanisms can be used in other embodiments.

In an exemplary embodiment, the keypad controller 112 includes a printed circuit board assembly, including electronic devices and electrical interconnects configured to support and operate the displays in the keypad assemblies 102, described in greater detail below. The keybutton frame assembly 114 is configured to support a plurality of conventional keys 104 (illustrated in FIG. 1; not shown in FIG. 2 for clarity). Control electronics 116 associated with the conventional keys 104 can optionally be included on a separate printed circuit board that is mounted to the keybutton frame assembly 114. In a modified embodiment, the control electronics 116 associated with the conventional keys 104 can be included on the printed circuit board supporting the keypad controller 112.

The keyboard 100 can optionally further include one or more auxiliary function keys 118. In such embodiments, the auxiliary function keys 118 optionally have fixed labels, and are associated with functions that are either preset or user-configurable. In configurations where the auxiliary function keys 118 are associated with functions that can be toggled on/off (such as a text insert/overwrite toggle function), an optical indicator (such as a light emitting diode) can optionally be associated with one or more of the auxiliary function keys 118. For example, the optical indicator can be positioned adjacent to or within an auxiliary function key 118.

Optionally, one or more of the auxiliary function keys 118 can be used to control the displays in the keypad assemblies 102. For example, the function keys 118 can be used to cause the displays to present a default set of text and/or symbols that are associated with corresponding functions that are executed upon a user depressing the associated key in the keypad assemblies 102. For example, the function keys 118 can be programmed to cause the displays to revert back to a previous state or to display information about a commercial sponsor. The function keys 118 can also be used to turn on or off one or more backlights associated with the keypad assemblies 102. In still other embodiments, the function keys 118 can be used as "shortcut" keys, programmed to cause a certain program or website to open.

Still referring to the exemplary embodiment illustrated in FIG. 2, a keyboard top frame 120 is mounted to the base frame 110, such that the internal components of the keyboard 110 described above are secured therein. The top frame 120 and the base frame 110 can be fastened together using an appropriate fastening mechanism, such as screws, epoxy and/or snap-fittings. Other fastening mechanisms can be used in other embodiments. The top frame 120 includes voids or open spaces 122 to allow the conventional keys 104 and the auxiliary function keys 118 to be accessible to the user after assembly.

As illustrated, the keyboard top frame 120 further includes one or more recessed sections 124 configured to house the keypad assemblies 102. As described above, the recessed sections 124 can be positioned above, below or to the side of the conventional keys 104. The keypad assemblies 102 can be fastened into the recessed sections 124 using an appropriate fastening mechanism, such as screws, epoxy and/or snap-fittings. Other fastening mechanisms can be used in other embodiments. In an exemplary embodiment, the keyboard top frame 120 includes an opening 126 in the recessed section 124 to allow one or more cables to be passed from the keypad assemblies 102 to the keypad controller 112 mounted within the keyboard 100 (see FIG. 2).

In certain embodiments, the keyboard 100 described herein can be efficiently manufactured by mounting the internal components of the keyboard 100 within the keyboard base frame 110, and then enclosing the keyboard 100 with the top frame 120. For example, the display controller 112, keybutton frame assembly 114 and the control electronics 116 can be mounted to the keyboard base frame 110 using an appropriate fastening mechanism, such as screws, epoxy and/or snap-fittings. Auxiliary function keys 118, if included, can also be mounted within the keyboard 100. The top frame 120 can then be mounted to the base frame 110, thereby helping to secure the internal components in place. The keypad assembly/assemblies 102 can then be mounted in the recessed sections 124 of the keyboard top frame 120. In other embodiments, the manufacturing sequence described herein can be performed in a different order, and can omit certain steps or include other steps not specifically recited here.

Figure 4:
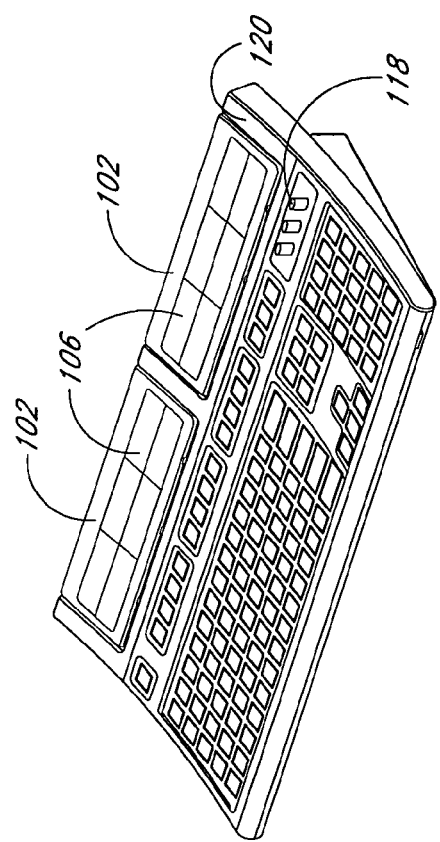
FIG. 4 is a perspective view of the keyboard of FIG. 2 in an assembled configuration.
Figure 3:
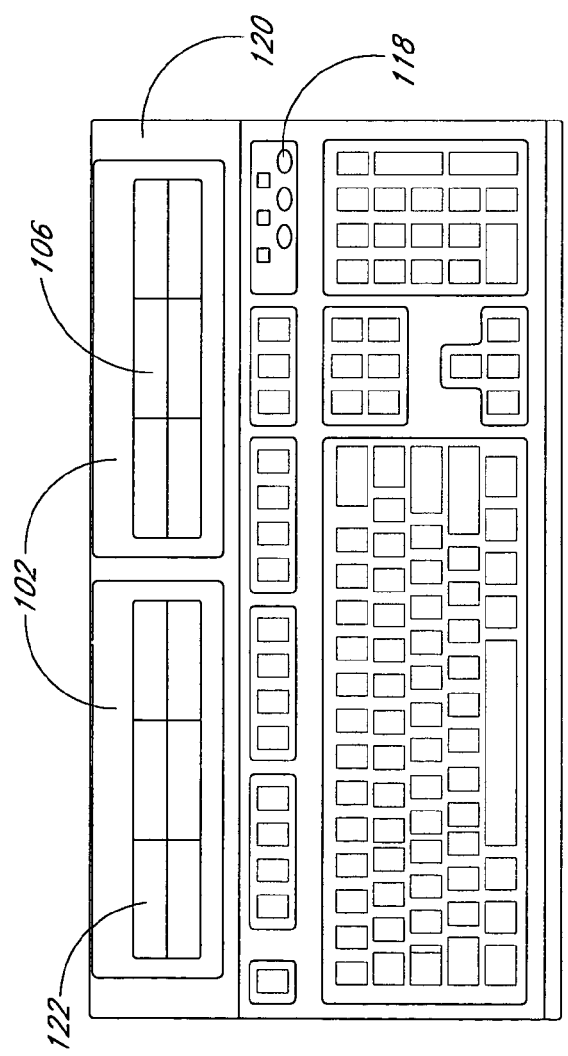
FIG. 3 is a top view of the keyboard of FIG. 2 in an assembled configuration.

FIG. 3 illustrates a top view of an exemplary embodiment of the assembled keyboard 100, and FIG. 4 illustrates a perspective view of the same structure.

Keypad Assemblies.

As described above, in an exemplary embodiment the keyboard 100 includes one or more recessed sections 124 configured to house the keypad assemblies 102. An exploded view of certain components in an exemplary embodiment of a keypad assembly 102 is illustrated in FIG. 5, and an assembled view is illustrated in FIG. 6.

Figure 5:
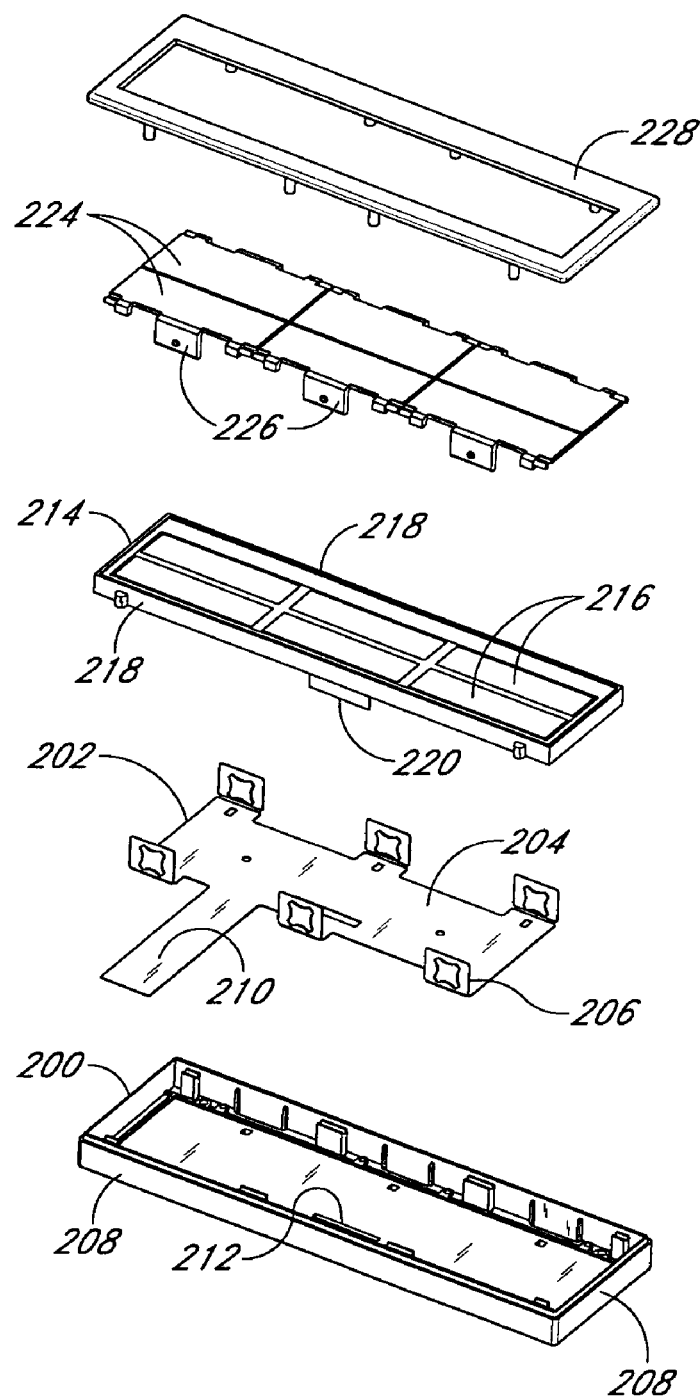
FIG. 5 is an exploded view of certain components of an exemplary embodiment of a keypad assembly.
Figure 6:
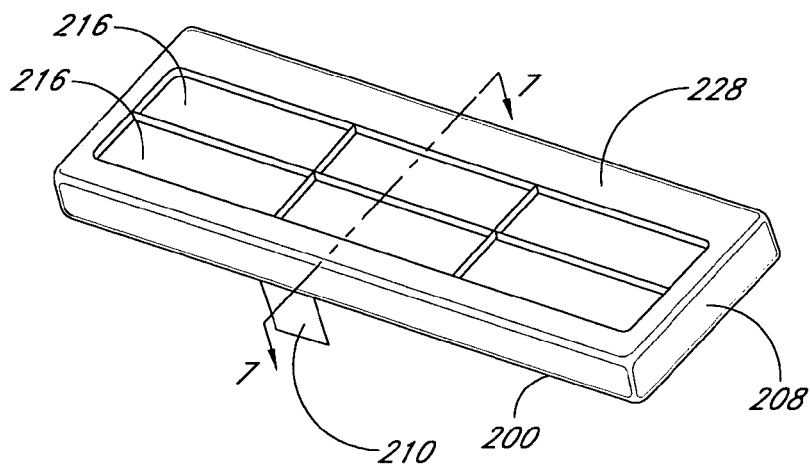
FIG. 6 is a perspective view of the keypad assembly of FIG. 5 in an assembled configuration.

Referring now to the exemplary embodiment illustrated in FIG. 5, the keypad assembly 102 includes a subassembly base frame 200 having raised sidewalls 208. The subassembly base frame 200 is dimensioned to fit within the recessed section 124 of the keyboard 100. In an exemplary embodiment, the subassembly base frame 200 includes molded plastic, although other rigid or semi-rigid materials capable of supporting the keypad assembly components described herein can be used in other embodiments. The subassembly base frame 200 includes one or more openings 212 to allow cables or other interconnects to be passed from the components of the keypad assembly 102 to the keypad controller 112 (see FIG. 2).

Still referring to the exemplary embodiment illustrated in FIG. 5, a membrane assembly 202 is positioned within the subassembly base frame 200. In such embodiments, the membrane assembly 202 includes a planar base 204 supporting one or more raised dome switches 206 around the perimeter of the planar base 204. For example, in the exemplary embodiment illustrated in FIG. 5, the dome switches 206 are oriented approximately perpendicular to the planar base 204, such that they are positioned along the interior of the raised sidewalls 208 of the subassembly base frame 200. This is further illustrated in the cross-sectional view of the keypad assembly 102 illustrated in FIGS. 7A and 7B.

Figure 9:
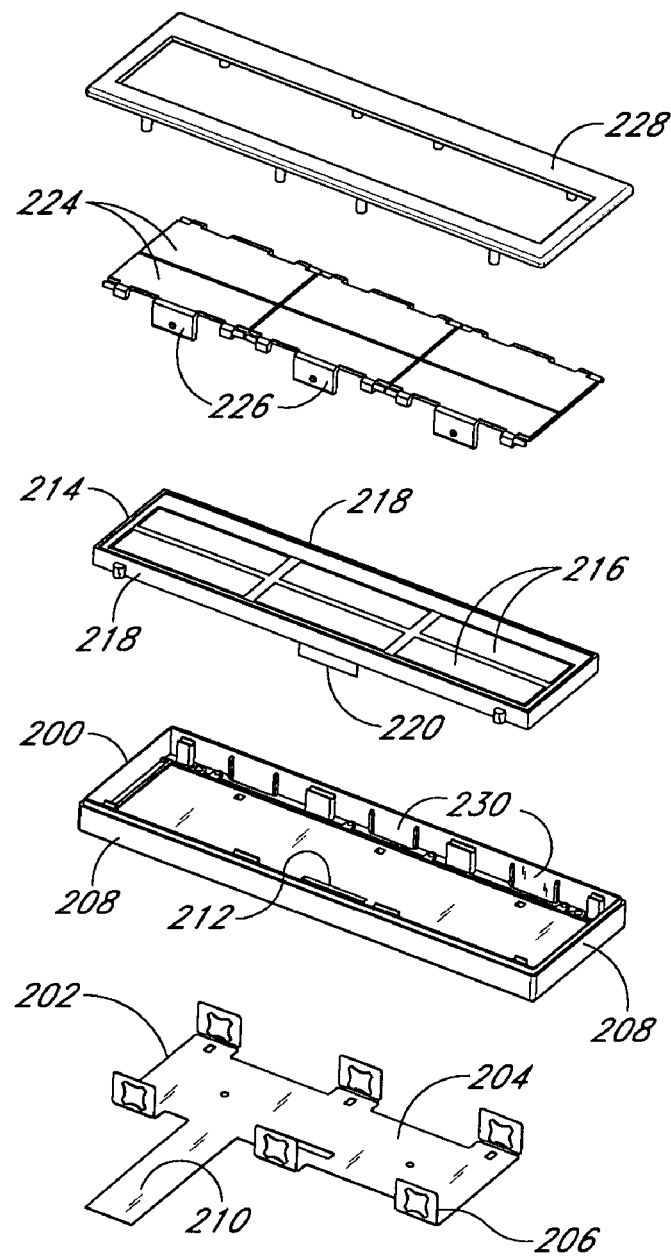
FIG. 9 is an exploded view of a keypad assembly having a membrane assembly that is positioned external to the subassembly base frame.

In a modified embodiment, illustrated in FIG. 9, the subassembly base frame 200 is configured to be positioned over the membrane assembly 202, such that the subassembly base frame 200 overlies the planar base 204. In such embodiments, the subassembly base frame 200 includes one or more slots 230 through which the raised dome switches 206 can be fitted. Thus, similar to the embodiment described above, the dome switches 206 are positioned along the interior of the raised sidewalls 208 of the subassembly base frame 200.

In an exemplary embodiment, the dome switches 206 include a resilient, tactile electronic switch configured to close an electronic circuit when a force is applied thereto. When the force is removed from the dome switch 206, the circuit opens. For example, in one embodiment, the dome switches comprise a 4-legged metal snap dome having a diameter between approximately 12.0 mm and approximately 12.5 mm, and having an activation force of approximately 400 g±5%. When depressed, the dome switch contact surface moves approximately 0.5 mm. One dome switch meeting these specifications is part number FD12450, available from Snaptron, Inc. (Loveland, Colo.). Another dome switch meeting these specifications is the Switch Air Metal Dome available from Nicomatic (Warminster, Pa.). Other dome switches having other specifications can be used in other embodiments. For example, by altering the dome switch activation force, the tactile feel of the key presses can be manipulated. Specifically, using a dome switch with a greater activation force will cause the key presses to be more apparent to the user; likewise, using a dome switch with a reduced activation force will cause the key presses to be more subtle to the user.

The membrane assembly 202 further includes electrical traces leading from the one or more dome switches 206 to a switch cable 210, such that the electronic circuit is at least partially incorporated within the membrane assembly 202. The switch cable 210 can be a flexible ribbon cable, and is passed through the opening 212 in the subassembly base frame 200 to the keypad controller 112. This configuration allows the keypad controller 112 to monitor the status of the dome switches 206, and to detect when a force has been applied to a particular dome switch 206 (referred to herein as the dome switch 206 being "activated"). In a modified embodiment, the dome switches 206 are configured to generate an audible indicator, such as a clicking noise, when activated, thereby providing the user with an audible indication that one of the dome switches 206 has been activated.

Still referring to the exemplary embodiment illustrated in FIG. 5, a display assembly 214 comprising one or more display segments or areas 216 is positioned over the membrane assembly 202. In one embodiment, the display assembly 214 includes a liquid crystal display having six display segments, such as LCD Module Model WD-G3806V-2WLWA, available from Wintek Corporation (Taichung, Taiwan), the details of which are provided below. However, other types of displays having a different number of display segments can be used in other embodiments. For example, the display assembly 214 can also comprise an emissive display, such as a light emitting diode array, a light emitting polymer display, an organic light emitting diode, a plasma display, or a fluorescent display.

In embodiments wherein LCD or other non-emissive displays are used, the display assembly 214 optionally further includes a backlight to provide supplemental illumination to the display segments 216, thereby facilitating use of the keyboard 100 in low light conditions. The backlight can include, for example, one or more white light emitting diodes or fluorescent bulbs. Electroluminescent lighting can also be used. In such embodiments, the display assembly 214 optionally includes a reflector configured to assist in directing or focusing light generated by the backlight onto and/or through the display segments 216.

The display assembly 214 further includes a display cable 220 that passes through the membrane assembly 202 and the subassembly base frame 200 to the display controller 112, thereby allowing the display controller 112 to control the display segments 216. In an exemplary embodiment, the display cable 220 includes a flexible ribbon cable. In a modified embodiment, the display cable 220 and the switch cable 210 can be incorporated into a single cable passing through the subassembly base frame 200 to the display controller 112.

Figure 7A:
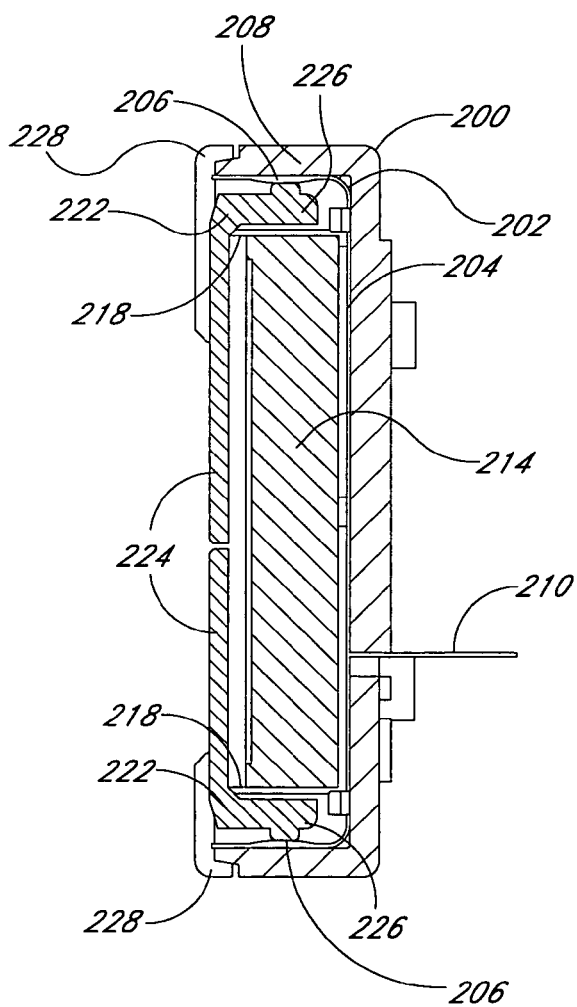
FIG. 7A is a cross-sectional view of the keypad assembly of FIG. 6 taken along line 7-7, wherein the key actuators are not activated.
Figure 7B:
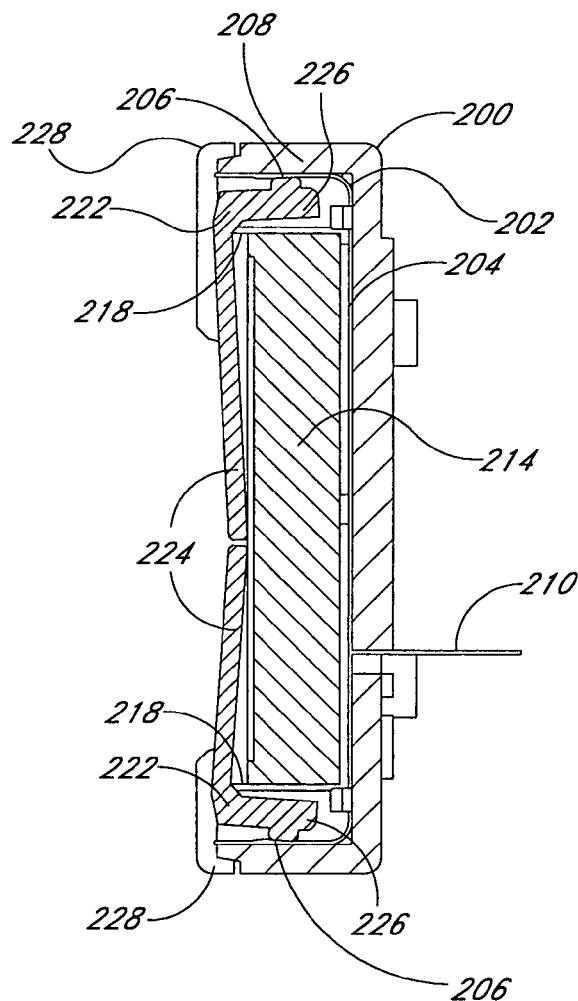
FIG. 7B is a cross-sectional view of the keypad assembly of FIG. 6 taken along line 7-7, wherein the key actuators are activated.
Figure 10:
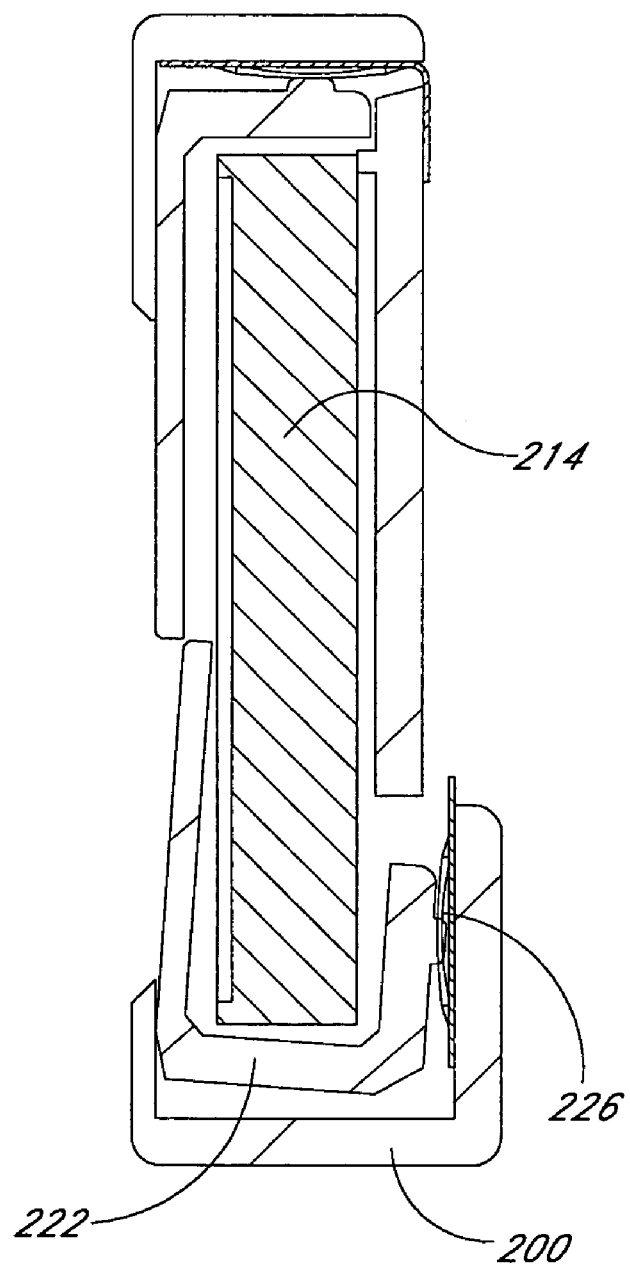
FIG. 10 is a cross-sectional view of a keypad assembly having dome switches mounted below the display assembly.

In an exemplary embodiment, the display segments 216 are at least partially surrounded by a raised sidewall 218, as illustrated in FIGS. 7A and 7B. In such embodiments, one or more key actuators 222 are positioned on the raised sidewall 218. The key actuators 222 illustrated in FIGS. 6, 7A and 7B correspond to the clear keys 106 illustrated in FIGS. 1, 3 and 4. In this example embodiment, the key actuators 222 have at least two arms. However, other embodiments can have one or more than two arms. A first arm, also referred to as the display arm 224, is positioned over at least a portion of the display assembly 214. The top surface of the first arm 224 acts as the key area which the user's finger will come in contact with when depressing the key. A second arm, also referred to as the switch actuator arm 226, is positioned between the display assembly 214 and the dome switches 206 of the membrane assembly 202. In a modified embodiment, the raised sidewalls 218 can be omitted, such as illustrated in FIG. 10.

In an exemplary embodiment, the display arm 224 is substantially transparent, such that a display segment 216 is visible through the display arm 224. In an exemplary embodiment, the display arm 224 is clear, although in other embodiments a colored hue is applied to the display arm 224. A separate key actuator 222 is positioned over each of the plurality of display segments 216 comprising the display assembly 214. In a modified embodiment, the display arm 224 can optionally be configured to provide magnification of the display segment 216, thus facilitating viewing of the display segment by the user. In another exemplary embodiment, the display arm 224 and the switch actuator arm 226 are approximately perpendicular to each other.

When the key actuator 222 is positioned as illustrated in FIGS. 7A and 7B, the key actuator 222 can pivot around the raised sidewall 218 when depressed by a user, such that pressing the display arm 224 toward the display assembly 214 causes the switch actuator arm 226 to depress and activate the dome switch 206. Specifically, FIG. 7A illustrates two key actuators 222 in a neutral position, such that the dome switches 206 are not activated, and FIG. 7B illustrates two key actuators 222 in an activated position, such that the dome switches 206 are activated. Although FIGS. 7A and 7B illustrate the membrane assembly 202 internal to the subassembly base frame 200, the operation of the key actuators 222 is substantially similar in embodiments wherein the membrane assembly 202 is external to the subassembly base frame 200 (such as illustrated in FIG. 9). In an exemplary embodiment, the display arm 224 has a maximum travel of approximately 1.5 mm when passing between the non-activated position and the activated position.

Referring again to FIG. 5, in an exemplary embodiment the keypad assembly 102 further includes a top cover 228. In such embodiments, the top cover 228 is configured to fixedly mount to the sidewalls 208 of the subassembly base frame 200, and to secure the internal components of the keypad assembly 102 in place. The top cover 228 is configured to leave at least a portion of the display arms 224 of the key actuators 222 exposed, thereby providing the user with access to the key actuator display arms 224. The top cover 228 also serves to frame the display segments 216 for the user and to provide a visually appealing finished assembly, obscuring internal components such as the dome switches 206, the raised sidewall 218 and the switch actuator arms 226. The top cover 228 can be secured to the sidewalls 208 using an epoxy, snap-fittings or another suitable fastening mechanism.

In a modified embodiment, the dome switches 206 can be positioned below the display assembly 214, such as illustrated in FIG. 10. In such embodiments, the key actuator 222 has a J-shape, rather than the L-shape used with the side-mounted dome switches described above. Furthermore, the raised sidewall 218 can be omitted in such embodiments.

In certain embodiments, the keypad assemblies 102 described herein can be efficiently manufactured by mounting the internal components of a keypad assembly 102 within the subassembly base frame 200, and then enclosing the keypad assembly 102 with the top cover 228. For example, the membrane assembly 202, display assembly and key actuators 222 can be mounted in the subassembly base frame 200 using appropriate fastening mechanisms, such as screws, epoxy and/or snap-fittings. The top cover 228 can then be mounted to the subassembly base frame 200, thereby helping to secure the internal components in place. As described above, in a modified embodiment, the membrane assembly 202 can be positioned external to the subassembly base frame 200. The keypad assembly/assemblies 102 can then be mounted in the recessed sections 124 of the keyboard top frame 120. In other embodiments, the manufacturing sequence described herein can be performed in a different order, and can omit certain steps or include other steps not specifically recited here.

Operation and Use.

As described above, in an exemplary embodiment, the keypad assembly 102 is configured such that when a user presses a display arm 224 toward the display assembly 214, the switch actuator arm 226 swings outward and activates a corresponding dome switch 206. Activation of the dome switch 206 is electronically detected by the display controller 112, which can perform further processing steps based on the activation of the dome switch 206, or which can pass an activation signal to other components remote from the keyboard 100, such as to a computer.

In embodiments wherein the display arm 224 is substantially transparent, the display segments 216 are visible through the display arm 224. This configuration advantageously provides a key with a changeable key label. For example, if a particular function is assigned to one of the key actuators 222, then a label corresponding to that function can be displayed on the display segment 216 underlying the display arm 224 of that key actuator 222. If the function of the key actuator 222 is changed, such as might occur if a computer user switches to a different software application, then a different label can be displayed on the display segment 216 underlying that key actuator 222.

The display controller 112 can control the labels displayed on the display assembly 214, as well as monitor the activation status of the dome switches 206. Information can be passed between the display controller 112 and the keypad assembly 102 via the switch cable 210 (for activation signals from the dome switches 206) and the display cable 220 (for information to be displayed on the display assembly 214). In an exemplary embodiment, the display controller 112 can change the labels displayed on the display segments 216 based on the activation status of the corresponding dome switches 206. In other embodiments, the display controller 112 can display animated or scrolling labels on the display assembly 214. In still other embodiments, such as when the keyboard 100 is used with a computer, the display controller 112 can receive commands and graphical information from the computer. For example, the computer can command the display controller 112 to display a specified textual string on a particular display segment 216 when a word processor is active, and can command the display controller 112 to display a graphical icon on the same display segment 216 when a flight simulator game is active.

Display Assembly.

As described above, in an exemplary embodiment the display assembly 214 includes a LCD Module Model WD-G3806V-2WLWA, available from Wintek Corporation (Taichung, Taiwan). This display assembly 214, referred to herein as the "LCD module", includes six display segments, each comprising a 128×32 array of individually-addressable liquid crystal display ("LCD") pixels which can be turned on or off. The six display segments need not by physically separated from each other, such that the display assembly effectively comprises a single 384×64 array of LCD pixels.

In other embodiments, the display assembly 214 can comprise a color display, such that the pixels can generate multiple colors.

Figure 8:
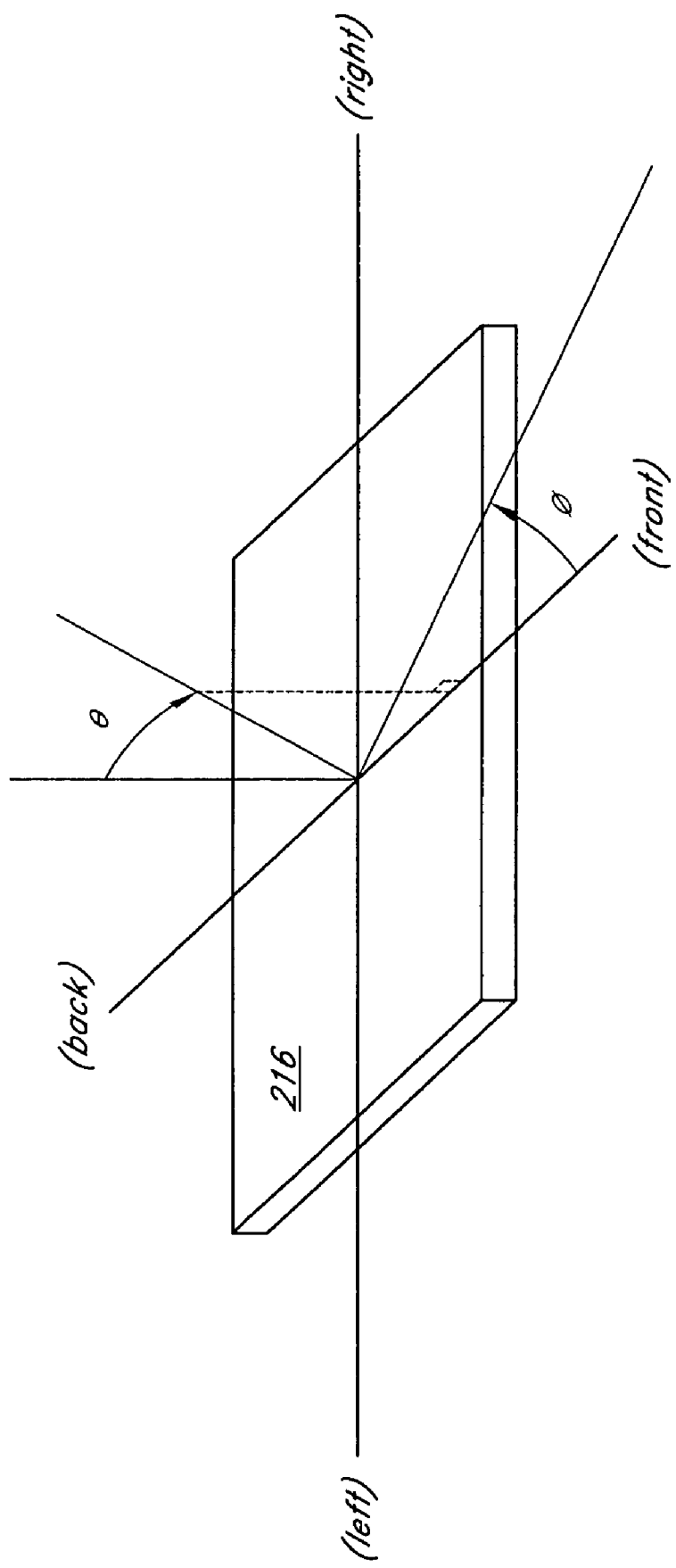
FIG. 8 defines viewing angles with respect to the surface of the display segments.

The LCD module provides optical characteristics that facilitate viewing the display segments 216 at a wide variety of angles. Such characteristics are particularly advantageous when the LCD module is to be incorporated into a keyboard which may be held at a wide variety of angles with respect to the user's eyes. For example, FIG. 8 defines several viewing angles with respect to the surface of the display segment 216. For example, a "viewing elevation angle" $\theta$ is defined as the angle away from the normal at which the display segment 216 is viewed, such that viewing the display segment 216 from directly above is considered viewing from a viewing elevation angle $\theta=0°$. Similarly, a "lateral viewing offset" $\phi$ is defined as the angle away from a direct frontal view at which is display segment 216 is viewed, such that a direct frontal view of the display segment 216 is at a lateral viewing offset $\phi=0°$, and such that a direct side view of the display segment 216 is at a lateral viewing offset $\phi=90°$. The following table provides selected operating parameters of the LCD module that can advantageously be used in an exemplary embodiment. In particular, these parameters provide the user with the ability to read the LCD module from a wide variety of viewing angles:

| viewing location | viewing elevation angle $\theta$ | lateral viewing offset $\phi$ | contrast ratio |
|---|---|---|---|
| A | less than 55° | about 0° | greater than 2.0 |
| B | about 0° | about 0° | greater than 5.0 |
| C | about 0° | about 90° | greater than 2.0 |

As used herein, the "contrast ratio" is defined as the ratio of the brightness of a LCD pixel that is turned on to the background.

In an exemplary embodiment wherein the display assembly 214 includes a 384×64 array of LCD pixels, the display assembly is approximately 187.4 mm wide by 46.9 mm high by 7.5 mm thick. In such embodiments, each of the LCD dots is approximately 0.425 mm wide by approximately 0.425 mm high, with a dot pitch of approximately 0.44 mm. In other embodiments, other display assembly and pixel dimensions can be used.

CONCLUSION

Various embodiments of a keyboard having changeable key labels are disclosed herein. Such embodiments allow a single display to be used to display a changeable message under a plurality of transparent key actuators. The changeable label can be graphical, textual, or can include some combination of both graphics and text. This configuration can advantageously reduce the confusion arising when a user cannot remember which functions are assigned to which keyboard keys in which contexts. Additionally, certain embodiments described herein can be manufactured relatively easily and efficiently. In particular, in embodiments wherein the keyboard has several keys overlying a single display, there is no need to separately mount a distinct display for each key, thus providing a simplified design.

SCOPE OF THE INVENTION

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than keyboards for use with personal computers.

What is claimed is:

1. A keypad comprising:
a display apparatus having a display surface and a display perimeter surrounding the display surface;
a sidewall positioned along at least a portion of the display perimeter, the sidewall extending above the display surface to a sidewall pivot line;
a key actuator having a short arm and a long arm, wherein the key actuator contacts the sidewall pivot line, thereby allowing the key actuator to rotate about the sidewall pivot line; and
a switch positioned adjacent the key actuator short arm, such that when a force is applied to move the key actuator long arm toward the display, the key actuator rotates about the sidewall pivot line and the key actuator short arm engages the switch.

2. The keypad of claim 1, wherein the key actuator is positioned such that at least a portion of the display surface is viewable through the key actuator.

3. The keypad of claim 1, wherein the switch forms a portion of a flexible membrane assembly mounted adjacent to the display, the flexible membrane assembly having a plurality of conductive circuit paths formed thereon.

4. The keypad of claim 1, wherein the display apparatus comprises a plurality of selectable pixels, and wherein the pixels have a contrast ratio of greater than approximately 2 when the display is viewed from a viewing elevation angle of less than approximately 55°.

5. The keypad of claim 1, wherein the display apparatus comprises a plurality of selectable pixels, and wherein the pixels have a contrast ratio of greater than approximately 5 when the display surface is viewed from a viewing elevation angle of approximately 0° and from a lateral viewing offset of approximately 0°.

6. The keypad of claim 1, wherein the display apparatus comprises a plurality of selectable pixels, and wherein the pixels have a contrast ratio of greater than approximately 2 when the display surface is viewed from a lateral viewing offset of approximately 90°.

7. The keypad of claim 1, further comprising a backlight configured to provide display illumination.

8. The keypad of claim 1, further comprising a backlight configured to provide display illumination, wherein the backlight comprises a light emitting diode.

9. The keypad of claim 1, further comprising:
a backlight configured to generate illumination; and
a reflector configured to reflect light generated by the backlight onto a liquid crystal display.

10. The keypad of claim 1, wherein the display apparatus includes a color display.

11. The keypad of claim 1, wherein the display apparatus includes a monochrome display.

12. The keypad of claim 1, wherein the switch is configured to create an audible indicator when the key actuator short arm engages the switch.

13. The keypad of claim 1, wherein the switch comprises a depressible dome switch that generates an electrical signal when the key actuator short arm engages the switch.

14. The keypad of claim 1, wherein the key actuator is substantially transparent.

15. The keypad of claim 1, wherein the key actuator has an L-shape, such that the key actuator short arm and the key actuator long arm are substantially perpendicular to each other.

16. The keypad of claim 1, wherein the display apparatus includes a liquid crystal display.

17. The keypad of claim 1, wherein the display apparatus comprises an emissive display.

18. The keypad of claim 1, further comprising a processor, wherein the switch provides an input signal to the processor when the key actuator short arm engages the switch, and wherein the processor provides display data to the display apparatus.

19. The keypad of claim 1, further comprising a processor, wherein:
the switch provides an input signal to the processor when the key actuator short arm engages the switch;
the processor provides display data to the display apparatus; and
the display data comprises information associated with a function to be performed by the processor upon receipt of the input signal.

* * * * *